United States Patent [19]

Berlin et al.

[11] 3,716,571

[45] Feb. 13, 1973

[54] OLIGOCARBONATE ACRYLATES AND A PROCESS FOR PRODUCING THE SAME

[75] Inventors: Alfred Anisimovich Berlin; Tamara Yakovlevna Kefeli; Natalia Lvovna Marshavina, all of Moscow; Grigory Mikhailovich Strongin, Dzerzhinsk; Nikolai Vladimirovich Kara-Giaur, Dzerzhinsk; Boris Ivanovich Kolomazov, Dzerzhinsk; Alexei Vasilievich Efimov, Dzerzhinsk; Aglaida Nikolaevna Bodrova, Dzerzhinsk; Judif Markovna Altshuler, Dzerzhinsk, all of U.S.S.R.

[73] Assignee: Institut Khimicheskoi Fiziki an SSSR, Moscow, U.S.S.R.

[22] Filed: July 2, 1969

[21] Appl. No.: 838,648

[52] U.S. Cl. ......260/463, 260/47 XA, 260/77.5 UA, 260/41 AG
[51] Int. Cl. ....C07c 69/54, C08g 17/10, C08g 17/13
[58] Field of Search ............260/463, 77.5 UA, 47 X

[56] References Cited

UNITED STATES PATENTS

| 2,370,572 | 2/1945 | Muskat et al. | 260/463 |
|---|---|---|---|
| 2,587,437 | 2/1952 | Bralley et al. | 260/77.5 |

FOREIGN PATENTS OR APPLICATIONS

| 606,716 | 8/1948 | Great Britain |
|---|---|---|

*Primary Examiner*—Lewis Gotts
*Assistant Examiner*—Diana G. Rivers
*Attorney*—Waters, Roditi, Schwartz & Nissen

[57] ABSTRACT

A novel class of polymerizable oligomers -oligocarbonate-acrylates and a process for producing the same by reacting monoesters of alkylene glycols and acids of the acrylic series with bischloroformates of glycols or bisphenols or with oligomeric compounds containing terminal bischloroformate groups.

Said unsaturated oligoesters may be used in compositions of contact binding fiberglass plastics, colorless film-forming materials, electroinsulating compositions, adhesives. Besides, they may be used for producing heat-resistant protecting glass of improved strength, optical components, injection molding plastics and other polymer materials.

5 Claims, No Drawings

OLIGOCARBONATE ACRYLATES AND A PROCESS FOR PRODUCING THE SAME

The present invention relates to oligocarbonate-acrylates, a new class of oligomers which are capable of polymerization, and a process for producing the same.

The above unsaturated oligoesters can be utilized in contact binder compositions for glass-reinforced plastics, in colorless film-forming materials, electric insulating compositions and cements. They can also be applied for the production of extra strong heat resistant protective glass, optical details, cast plastics and other polymeric materials.

Thus, for example, a process is known for the production of oligomers capable of polymerization which comprises reacting glycols with a monofunctional unsaturated compound, viz. the monochloroformate of the monoester of ethylene glycol and an acid of the acrylic series.

Processes are known for the production of oligomers capable of polymerization containing terminal unsaturated groups of the acrylic, allyl or vinyl type and carbonate groups in the oligomeric block.

The telogen employed is produced in low yield and is not sufficiently homogeneous. This lowers the yield and purity of the final products.

A process is likewise known for the production of oligomers capable of polymerization which comprises reacting glycols with phosgene, followed by esterification with acids of the acrylic series in the presence of acid catalysts.

The employment of acid catalysts in the above process gives rise to various side reactions, resinification and the formation of a mixture of colored products which are difficulty separable.

Processes are also known for the production of oligomers capable of polymerization which comprise reacting allyl alcohol with bischloroformates of glycols or reacting allyl monochloroformate with glycols.

Said processes lead to the formation of difficultly polymerizing oligomers.

It is known that the velocity of three-dimensional polymerization of diallyl esters, unlike that of the corresponding acrylic esters, sharply falls as the distance between the unsaturated groups increases. This causes a diminution in the depth of conversion of oligomer into polymer as it hardens and necessitates raising the temperature of polymerization in order to obtain great depth of conversion.

It is an object of the present invention to eliminate the above disadvantages.

It is a further and more specific object of the invention to provide a relatively inexpensive, easily polymerizing oligomers capable of conversion into colorless or slightly colored, transparent, infusible and insoluble polymers of cross-linked structure possessing greater strength under dynamic loads than polymers of other oligomers of the acrylic series capable of polymerization, as well as better dielectric, optical and other properties.

According to the invention, these objects have been accomplished by providing a new class of oligomers capable of polymerization, namely oligocarbonate-acrylates of the general formula:

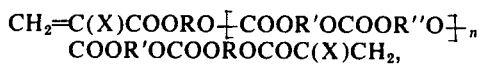

where $X$ is $H$, $CH_3$, halogen or $CN$;
$R$, a radical of a glycol or bisphenol;
$R'$, a radical of a glycol, bisphenol or polyol;
$R''$, a radical of a glycol, bisphenol or oligoether or oligoester;
and $n$ is 0.1 or an integer greater than 1.

The presence of terminal unsaturated acrylic or methacrylic groups in the present oligomers makes it possible to process said oligomers into infusible, insoluble polymers of cross-linked structure employing known principles of processing other classes of oligomers capable of polymerization, said processing not requiring high temperature, pressure or the use of solvents.

The combination of carbonate and acrylic groups in the present oligomers provides a set of valuable technical properties in polymers produced on the basis of said oligomers.

Oligocarbonate-acrylates of the above general formula can be produced, according to the invention, by a process which comprises reacting monoesters of alkylene glycols and acids of the acrylic series with glycol or bisphenol bischloroformates or with oligomeric compounds containing terminal bischloroformate groups, in a molar ratio of the reagents of 2.2:1, respectively in an organic solvent in the presence of organic bases in the temperature range from $=15°$ to $+80°C$, said oligomeric compounds being produced by the condensation of phosgene or glycol bischloroformates or bisphenol bischloroformates with glycols, bisphenols, polyols or oligoethers or oligoesters having terminal hydroxyl groups in a molar ratio of the reagents of 2:1 respectively in an organic solvent in the presence of organic bases in the temperature range from $-15°$ to $+80°$ C.

Among the monoesters of alkylene glycols and acids of the acrylic series employed in the present process are monoacrylic, monohaloacrylic, monocyanoacrylic and monomethacrylic esters of ethylene, diethylene, butylene and hexamethylene glycols and of diphenylolpropane and resorcinol, etc.

Among the glycol bischloroformates employed in the present process are the bischloroformates of ethylene, diethylene and butylene glycols; also employed in the present process are bischlorformates of bisphenols, such as the bischlorformates of diphenylolpropane, resorcinol, etc.

Various glycols may be employed in the present process, such as ethylene, diethylene, butylene and hexamethylene glycols. Various bisphenols can likewise be employed such as diphenylopropane and resorcinol.

Among organic bases there can be employed in the present process dimethylaniline, triethylamine and pyridine, and among organic solvents there can be employed methylene chloride, dichloroethane, nitrobenzene, dimethylformamide and ethylene dichloride.

By changing the character and size of the oligomeric block of the oligocarbonate-acrylate produced (the section of the oligomer chain between the unsaturated groups) it is possible to alter the character and frequency of the bridges in the cross-linked structure of the polymer, thus influencing the physico-chemical, mechanical and other properties of the polymers.

The present process makes it possible substantially increase both sources of raw materials for the production of relatively inexpensive oligomers capable of polymerization and the assortment of said oligomers.

The conditions in which the present process is carried out make it possible to avoid resinification and side reactions and obtain practically monodispersed, slightly colored or colorless oligoesters in high yield and of high quality.

The process of the present invention is illustrated in the following examples.

EXAMPLE 1

To a mixture of 2.2 mols of ethylene glycol monomethacrylate, 2.2 mols of pyridine and 6.4 mols of methylene chloride placed in a 4-necked flask fitted with a stirrer, a thermometer and a dropping funnel and cooled to minus 15°C is added dropwise with vigorous stirring a solution of 1.0 mol of diethylene glycol bischloroformate in 6.4 mols of methylene chloride. The solution is added at such a rate that the temperature of the reaction mixture does not rise higher than minus 5°C. The temperature of the reaction mixture is then gradually raised to 40°–45°C and the reaction mixture held at this temperature with stirring for 4.5 hours.

After cooling to room temperature the reaction mixture is filtered to remove the pyridine hydrochloride and treated once with an equal volume of 3 percent aqueous hydrochloric acid. The organic layer is washed with water until the reaction is neutral and the solution is free from chloride ion; the organic solution is then dried over calcined sodium sulfate and filtered to remove the drying agent.

To prevent polymerization before desired there is added to the filtrate an inhibitor of the type of diphenylolpropane which does not color the oligomer. The inhibitor is added in the amount of 0.03 percent of the weight of the synthesized oligomer, after which the solvent is distilled off at room temperature and a reduced pressure of 1–2 mm of mercury.

There is obtained in a yield of 85 percent a colorless, transparent oligomer of the formula $$CH_2=C-COOCH_2CH_2O\overset{O}{\overset{\|}{C}}OCH_2CH_2OCH_2CH_2O\overset{O}{\overset{\|}{C}}OCH_2CH_2OCOC=CH_2$$
$$\overset{|}{CH_3} \qquad\qquad\qquad\qquad\qquad\qquad\qquad \overset{|}{CH_3}$$

which has the following characteristics: C, 51.57% (calc. 51.66%); H, 6.30% (calc. 6.26%); bromine number 75.78 g Br/100 g (calc. 76.36 g Br/100 g; $d_{20}^{20}$ 1.209–1.211; $n_D^{20}$ 1.4650–1.4670; viscosity ≈400 cp. (at 20°C).

The velocity of polymerization of the oligomer in the presence of 1 percent benzoyl peroxide at 100°C does not exceed 1 min.

EXAMPLE 2

To a mixture of 1.65 mol of ethylene glycol monomethacrylate, 0.75 mol of butylene glycol bischloroformate and 4.7 mols of dichloroethane placed in a four-necked flask fitted with a stirrer, a thermometer and a dropping funnel and cooled to −15° C is added dropwise with vigorous stirring 1.65 mol of pyridine in 4.72 mols of dichloroethane at such a rate that the temperature of the reaction mixture does not rise higher than −5°C. The temperature of the reaction mixture is then gradually raised to 65°C and the reaction mixture held at this temperature with stirring for 4 hours.

After cooling to room temperature the reaction mixture is filtered to remove the pyridine hydrochloride and treated once with an equal volume of 3 percent aqueous hydrochloric acid. The organic layer is washed with water to a neutral reaction and the absence of chloride ions, dried over calcined sodium sulphate and filtered to remove the drying agent.

To prevent polymerization before desired there is added to the filtrate an inhibitor which does not color the oligomer, namely bis(5-methyl-3-tert.butyl-2-hydroxyphenyl)-methane, in the amount of 0.03 percent of the weight of the synthesized oligomer, after which the solvent is distilled off at room temperature and a reduced pressure of 1–2 mm of mercury.

There is obtained in a yield of 80percent a transparent, light yellow oligomer of the formula

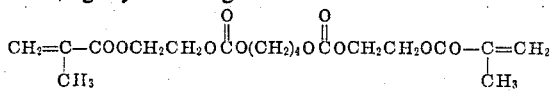

$$CH_2=C-COOCH_2CH_2O\overset{O}{\overset{\|}{C}}O(CH_2)_4O\overset{O}{\overset{\|}{C}}OCH_2CH_2OCO-C=CH_2$$
$$\overset{|}{CH_3} \qquad\qquad\qquad\qquad\qquad\qquad \overset{|}{CH_3}$$

which has the following characteristics: C, 53.63% (calc. 53.73%); H, 6.8% (calc. 6.51%); bromine number 76.5 g Br/100 g (calc. 79.44 g Br/100 g; $d_{20}^{20}$ 1.17–1.18; $n_D^{20}$ 20 1.4649; viscosity ≈ 300 cp. (at 20°C).

The velocity of polymerization of the oligomer in the presence of 1 percent benzoyl peroxide at 100°C is not more than 2 min.

EXAMPLE 3

In a flask fitted with a thermometer, a stirrer, a reflux condenser and a dropping funnel are placed 1.65 mol of ethylene glycol monomethacrylate, 1.65 mol of pyridine and 7 mols of methylene chloride.

0.75 mol of diphenylolpropane bischloroformate is dissolved with heating in 8 mols of methylene chloride and added dropwise to the reaction mixture which has been cooled to −15°C. The bischloroformate solution is added at such a rate that the temperature of the reaction mixture does not rise higher than 0°C. The contents of the flask are then warmed to 40°–42°C and held at this temperature for 3.5 hours. After cooling to room temperature the reaction mixture is filtered to remove the pyridine hydrochloride and treated once with an equal volume of 3 percent aqueous hydrochloric acid. The organic layer is washed with distilled water to a neutral reaction and until free from chloride ions, dried over sodium sulphate and filtered to remove the drying agent. An inhibitor, namely hydroquinone, is then added to the filtrate in the amount of 0.03 percent of the weight of the synthesized oligomer and the solvent distilled off at room temperature and reduced pressure of 1–2 mm of mercury.

There is obtained in ≈ 85 percent yield a colorless or slightly colored oligomer of the formula

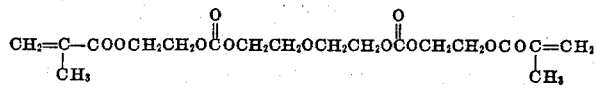
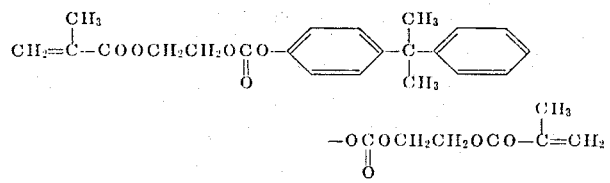

which has the following characteristics: C, 64.41% (calc 64.5%); H, 6.06% (calc. 5.97%); bromine number 57.11 g Br/100 g (calc. 59.12 g Br/100 g); $n_D^{20}$ 1.5314–1.5318; viscosity ≈ 1,000 cp. (at 20°C).

The velocity of polymerization of the oligomer in the presence of 1 percent benzoyl peroxide is not more than 3 min.

EXAMPLE 4

In a 4-necked flask is placed a solution of 1 mol of pyridine in 1.6 mol of methylene chloride. After cooling the solution to −10°C there is added dropwise a solution of 1 mol of diethylene glycol bischloroformate in 2.7 mols of methylene chloride, and then a solution of 0.5 mol in 0.3 mol of methylene chloride. The reaction mixture is then warmed to 40°C and held at this temperature for 1.5 hours, after which it is cooled to −10°C and to it is added dropwise a solution of 1 mol of pyridine in 3 mols of methylene chloride. The pyridine solution is added at such a rate that the temperature of the mixture does not rise higher than 0°C.

There is then cautiously added to the mixture 1 mol of ethylene glycol monomethacrylate in 3.5 mols of methylene chloride, holding the temperature not higher than 0°C.

The thick mass which forms is warmed to 42°C and held at this temperature for 2 hours with stirring.

After cooling to room temperature the reaction mixture is treated with 1 liter of 3 percent hydrochloric acid and washed with distilled water to a neutral reaction and the absence of chloride ion. The mixture is then dried over calcined sodium sulphate, filtered and hydroquinone is added in the amount of 0.03 percent of the weight of the synthesized oligomer.

The solvent is distilled off at room temperature and reduced pressure of 1–2 mm of mercury.

There is obtained in 80 percent yield an oligomer of the formula

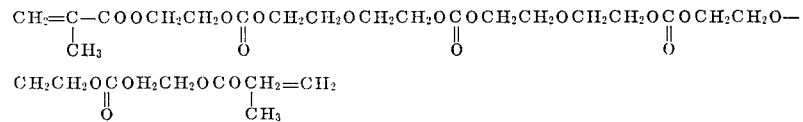

which is a very viscous, colorless and transparent substance with the following characteristics: C, 48.6 percent (calc. 49.2%); H, 6.4% (calc. 6.2%); $n_D^{20}$ 1.4680–1.4685; bromine number 44.6 g Br/100 g (calc. 46.8 g Br/100 G).

The velocity of polymerization of the oligomer in the presence of 1 percent benzoyl peroxide at 100°C is not more than 2.5 min.

Though the present invention has been described in accordance with a preferred embodiment, various changes and modifications may be made in carrying out the present invention without departing from the spirit and scope thereof as will be understood by those skilled in the art.

These changes and modifications are to be considered as falling within the spirit and scope of the invention as defined in the appended claims.

We claim:

1. An oligomer capable of polymerization which is an oligocarbonate-acrylate of the general formula $CH_2=C(X)COORO\dashv COOR'OCOOR''O\dashv_n COOR'O COOROCOC(X)=CH_2$, where X is H, $CH_3$, halogen or CN; R, R' and R'' are radicals selected from the group consisting of lower alkylene, oxydilower alkylene, lower alkylenediphenyl and phenylene radicals; and $n$ is 1 or more.

2. An oligomer as in claim 1 wherein R, R' and R'' are radicals selected from the group consisting of ethylene, butylene, hexylene, oxydiethylene, isopropylidenediphenyl, and o- phenylene radicals.

3. An oligomer according to claim 1 wherein X is $CH_3$, R is $CH_2CH_2$, R' and R'' are $CH_2CH_2-O-CH_2CH_2$ and $n$ is 1.

4. A process for the production of an oligocarbonateacrylate which comprises reacting a monoester of an alkylene glycol and an acid of the acrylic series with an oligomeric compound containing terminal bischloroformate groups, in a molar ratio of the reagents of 2.2:1 respectively in an organic solvent in the presence of an organic base in the temperature range from −15° to +80°C, said oligomeric compound being produced by the condensation of a compound selected from the group consisting of phosgene, glycol bischloroformates and bisphenol bischloroformates with a compound selected from the group consisting of glycols, bisphenols, polyols, oligoethers with terminal hydroxyl groups and oligoesters with terminal hydroxyl groups, in the molar ratio of the reagents of 2:1 respectively in an organic solvent in the presence of an organic base in the temperature range from −15° to +80° C.

5. A process as in claim 4 wherein the glycols are selected from the groups consisting of ethylene glycol, diethylene glycol, butylene glycol and hexylene glycol and the bisphenols are selected from the group consisting of diphenylolpropane and resorcinol.

* * * * *